April 19, 1927.                              1,624,913
J. W. AMES
MEANS FOR UTILIZING WASTE RUBBER
Filed April 25, 1922     2 Sheets-Sheet 1

INVENTOR,
J. W. Ames
By H. J. Bruckhart
Attorney.

April 19, 1927.
J. W. AMES
1,624,913
MEANS FOR UTILIZING WASTE RUBBER
Filed April 25, 1922    2 Sheets-Sheet 2
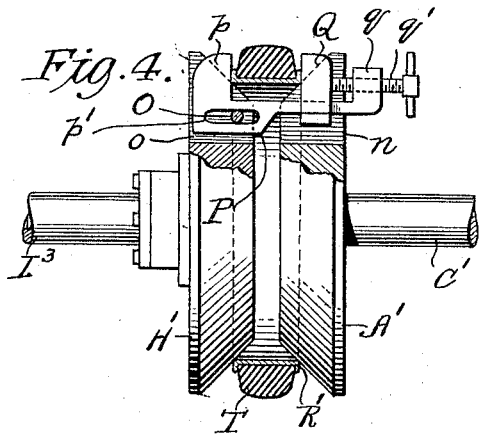
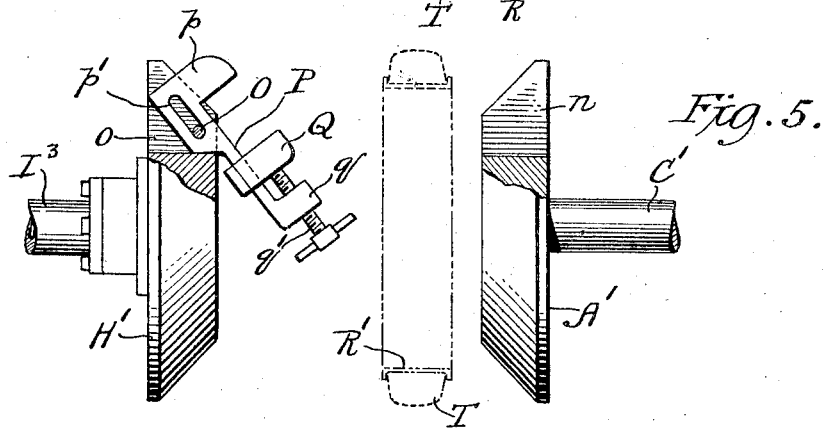
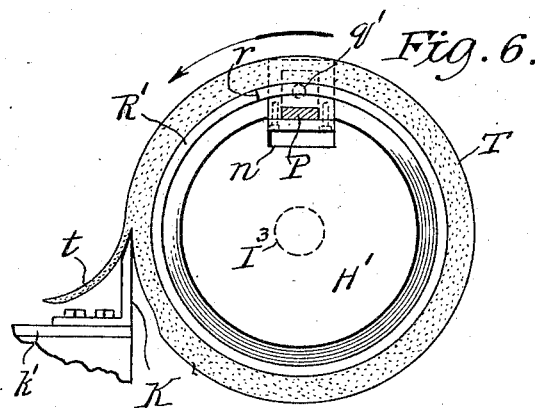
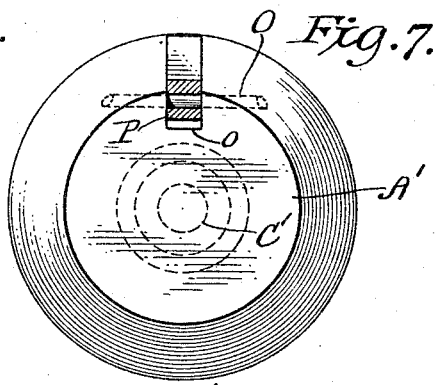
INVENTOR.
J. W. Ames
By H. J. Bernhard
Attorney.

Patented Apr. 19, 1927.

1,624,913

UNITED STATES PATENT OFFICE.

JAMES W. AMES, OF MONTCLAIR, NEW JERSEY.

MEANS FOR UTILIZING WASTE RUBBER.

Application filed April 25, 1922. Serial No. 556,545.

This invention pertains to the art of utilizing waste rubber, involving a mode of procedure and a novel apparatus, whereby such procedure may be practically carried into effect, with a view to the recovery from worn tires of rubber in such condition as to render the rubber available for use in the arts, such as in the production of rubber soles and heels for use on articles of foot wear, etc.

No claim is made herein to the method hereinafter disclosed.

Solid rubber tires now extensively used on the wheels of automobile trucks and other vehicles are so intimately associated with the rims, and are locked so firmly thereto, that it is difficult, if not impracticable, to bodily dislodge the rubber from the rim. Worn tires are frequently in such physical condition that the rubber as a tire is unsuited for further service, whereas said tire contains a substantial quantity of rubber which when recovered by a suitable mode of procedure is of good quality and is available for further use either in the shoe art, or in the tire art, or in other arts where rubber is now employed.

Among the practices now resorted to for the utilization of tire rubber is to mechanically dislodge the rubber en masse from the rim, or by subjecting the rubber to the action of heat, i. e., to burn the rubber off the rim; but such modes of treatment are lacking in efficiency owing to the deterioration in the quality of the rubber and the time and expense attendant upon such practices.

In my invention the rubber tire is mounted for bodily rotation, and the rubber is removed by cutting into the tire during the rotative movement thereof so as to result in the production of a relatively thin ribbon or strip in a continuous length, whereby the recovery is conducted in a manner to avoid deterioration of the rubber, and said rubber strip or ribbon is available for use in the production of appropriate articles, as, e. g. by stamping or cutting out the desired articles from said rubber strip or ribbon.

Other functions and advantages of the invention will appear from the following description taken in connection with the drawings, wherein—

Figures 4, 5, 6 and 7 are views of a form of apparatus designed for mounting the tire used on a split rim so as to effect the recovery of rubber from said tire; Figure 4 being a view partly in elevation and partly in section of the members assembled for service; Figure 5 being a similar view of the members separated for the mounting and dismounting of the rim and tire; and Figures 6 and 7 being views in elevation looking at the operative faces of the respective conical members shown at the right and left, respectively, in Figure 4.

Figure 1:
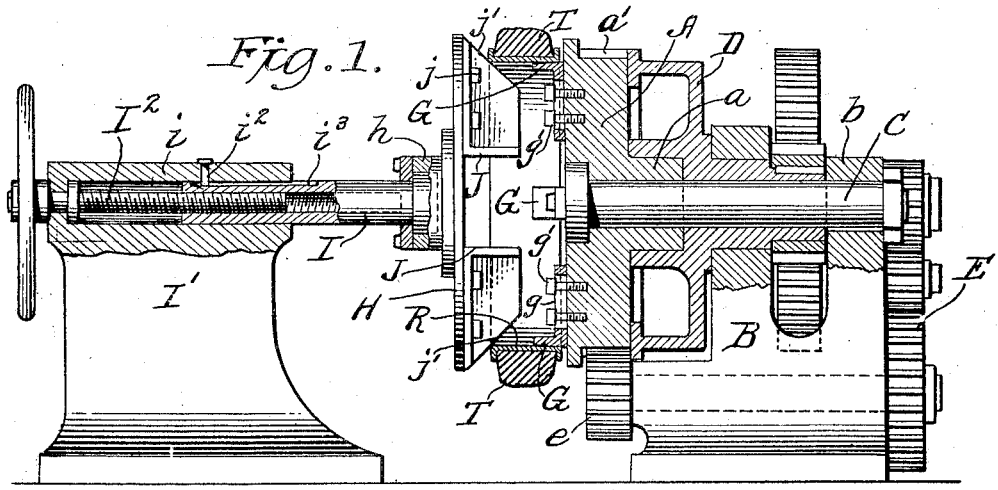
Figure 1 is an elevation, partly in section, of one form of apparatus designed for the recovery of rubber from tires used on solid unbroken rims.
Figure 2:
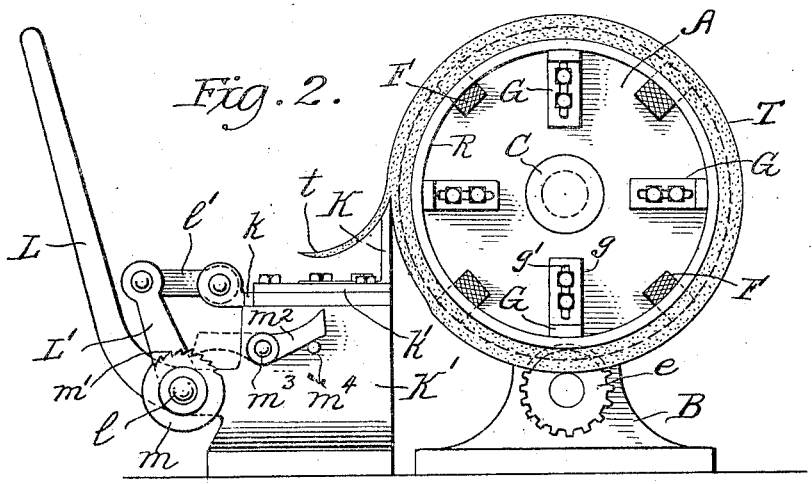
Figure 2 is an elevation looking toward the revoluble head on which the solid rim and tire are mounted and illustrating the controllable cutting means.
Figure 3:
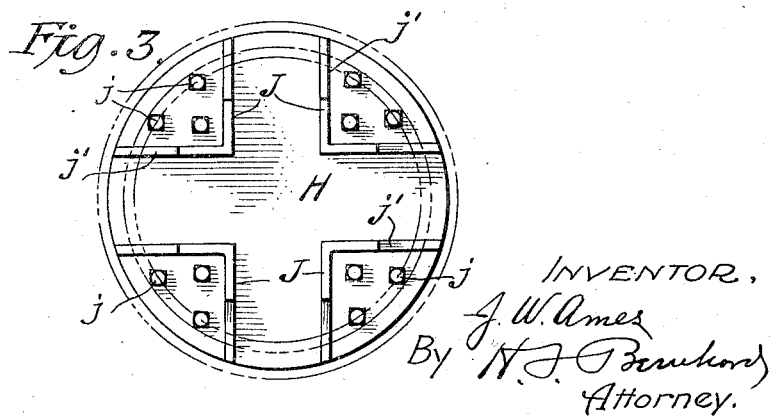
Figure 3 is an elevation looking at the face of the head on the tail-stock shown in Figure 1.

Referring to the form of apparatus shown in Figures 1 to 3, inclusive, of the drawings, A is a revoluble head shown as having a hub, $a$, the same fitting within a recess of a pulley D and said hub and pulley being carried by a spindle C, see Figure 1, said spindle being mounted in a bearing $b$ of a frame or pedestal B. Coaxial with the head is the spindle C passing through the hub and the bearing, and on this spindle is loosely mounted the driving pulley D operable in a manner similar to a lathe for imparting motion to a train of speed reducing gears E, one of which gears of said train, indicated at $e$, is in mesh with a gear $a'$ of the head A, whereby motion is imparted to said head and at relatively slow speed. Head A carries means for engagement with the rim R of a rubber tire T, in a manner to expose the periphery of said tire to ready access by an appropriate cutting means presently to be described, said tire engaging means being illustrated in Figure 2 as a plurality of contact plates F and a plurality of retainers G. The contact plates F are provided with roughened or serrated faces, and said plates are fixedly attached to the head A, adjacent the periphery thereof, so that the roughened faces of said plates protrude slightly from the surface of the head. The contact plates are shown as spaced equidistantly on the head, and said plates are positioned in alternate order with respect to the retainers G, each retainer being shown in Figures 1 and 2 as having a slotted body portion $g$ fitted against the face of the head and fixed thereto by bolts $g'$, whereby the retainer may be shifted radially with respect to the head, whereby the contact plates and the retainers are adapted for service in connection with rims R of varying diameters.

Co-operating with the head A is another head H mounted for free rotation on a tailstock spindle I, said head H having a swiveled connection at $h$ with said spindle I, whereby the idle head H is mounted for rotation with the power driven head A. Said head H is provided on that face which opposes head A with means for wedging contact with the tire rim R, and in Figures 1 and 3 said wedging means is shown as a plurality of members J fitted against the face of the head H and bolted solidly thereto at $j$, said members being provided with inclined faces $j'$ adapted for engagement with the edge portion of rim R and to be pressed with considerable force into the rim whereby the devices provided on said heads A H co-operate in retaining the rim and the tire in fixed relation to the two heads so as to insure the conjoint rotation of the rim, the tire and the two heads A H against the very considerable resistance afforded by the contact of the cutting means with the rubber material in the operation of removing the rubber material in a ribbon or strip from the solid mass of rubber in the body of the tire. As shown, the tail-stock spindle I is tubular and internally threaded, said spindle being mounted for endwise movement in a bearing $i$ of a pedestal I', and said spindle being held from rotative movement by a key $i^2$ fitting in a key-way $i^3$ provided in the spindle lengthwise thereof. An adjusting screw $I^2$ has threaded engagement with the female threaded portion of the tubular tail-stock spindle and is mounted in the bearing $i$ so as to be held against sliding movement relatively thereto, said screw $I^2$ affording means operable at will for imparting movement to head H relatively to the head A, whereby the head H may be shifted away from and toward the head A to provide for the replacement of the rims and tires as required.

Various forms of cutting means may be employed, said cutting means being positioned in co-operative relation to the tire for removing therefrom a continuous slice or ribbon of rubber adapted without further treatment to be utilized in the production of various articles. Owing to the resistance of the rubber to the action of the cutter, it is necessary to mount said cutter in a secure manner to the path of rotation of the tire, but this cutter requires to be under direct manual control for the purpose of shifting the cutter, so as to make fresh cuts into the material and to withdraw the cutter should it encounter a metallic substance, such as nails, wires, glass or other hard substance embedded in the body of the tire. The cutter shown in Figure 2 comprises a blade K having a shank $k$ fitted for sliding movement in a guideway $k'$ provided on the bed or pedestal K'.

With said slidable cutter is associated a controlling lever L, fulcrumed at $l$ in the pedestal, said lever being operable for moving a rockable arm L' which is connected by a link $l'$ to the shank $k$ of the cutter. The throw of the controlling lever for advancing the cutter to an operative position relatively to the rotating tire is determined by an escapement, shown in Figure 2 as a segment $m$ fast with the fulcrum $l$ and provided with ratchet teeth $m'$ and a dog $m^2$ pivoted at $m^3$ on the pedestal K', the dog being arrested in a retracted position by a stop $m^4$.

The operation of the apparatus shown in Figures 1 to 3, inclusive, for removing rubber from a tire on a solid rim is as follows: With the head H shifted out of operative position and with the head A at rest, the rim carrying the tire is positioned against the face of head A for the serrated faces of plates F to contact with one edge of said rim, after which the retainers G are adjusted radially into contact with the inner face of the rim, and said retainers are bolted securely in place, for holding the rim in position in the head, A. Screw $I^2$ is now operated to advance the head H toward head A for the beveled faces $j'$ of the members J to contact with the opposite edge of said rim, thus wedging the members J into the solid rim, and coupling head H with the rim and with the head A, whereby the tire and the rim are retained in immovable relation to the co-operating heads A H. Motion is now imparted by pulley D to the train of gears for rotating head A at slow speed, thus imparting rotative movement to the rim and the tire and to the head H, whereby the tire is rotated with heads A H in a manner to fully expose the surface of the tire to the access of the slicing cutter K. Said cutter is under the direct control of the operator stationed at the machine for the reason that the cutter controlling lever L is operable manually. Said lever is moved by the attendant to control the cutter in a manner to preliminarily cut away the rough surfaces on the periphery of the tire during the initial rotative movement thereof, should the condition of the tire necessitate such preliminary treatment, and thereafter the attendant presses on the lever to advance the cutter into the body of the rotating mass of rubber and to a predetermined depth so as to cut into the rotating rubber mass with a view to effecting the removal of the rubber in a ribbon or slice continuously, the end portion of which slice or ribbon is indicated at $t$ in Figure 2. During the rotation of the rubber mass, the operator is required to hold the cutter up to the work by pressing continuously, and with considerable force, against the lever L, but the throw of the lever in advancing the cutter into the material is arrested according to a desired thickness of the slice by the dog $m^2$ fitting against a tooth of the ratchet formed segment $m$, as shown by dotted lines in Figure 2, the lever acting on the segment to press one tooth against the dog, so that the thickness of the ribbon as cut from the rubber mass is uniform, or substantially so, throughout the length of said ribbon or slice as cut from the rubber mass. The instantaneous control of the cutter by the operator is advantageous, also, in withdrawing the cutter from the rotating rubber mass in case the edge of the cutter encounters a hard substance, such as a nail or glass embedded in the rubber, it being well known that tires used on motor vehicles pick up hard substances during the service of such tires in city streets and on other roadways, but by making the cutter responsive to the control of the lever, the operator is enabled to shift the cutter away from the rubber mass and to readjust the cutter upon the removal of the obstruction from said rubber mass.

The apparatus heretofore described is useful, more particularly, in the recovery of rubber from tires associated with solid rims; but where tires are mounted fixedly on split rims I find it desirable to employ the mechanism illustrated in Figures 4 to 7, inclusive, wherein provision is made for retaining a metallic rim, as R', split or divided at $r$, in operative relation to co-operating conical heads A' H' by a locking mechanism which acts to fixedly hold the leading end of said split rim in immovable position relatively to said heads A' H'. Said heads A' H' correspond in function to the members A H of Figures 1 to 3; but the heads A' H' are of conical formation and are positioned in facing relation for wedging contact with the respective edge portions of the split rim R'. The heads A' H' are shown diagrammatically as being mounted on spindles C' I³, whereby rotative movement is given to head A' and the required adjustment of head H' with respect to head A' may be effected. The head A' thus acts as the driving member, whereas head H' is a driven member, but while the split rim and the tire are in a measure gripped by and between said conical members it is desirable to employ a locking means whereby the split rim R' is precluded from movement relatively to said heads under the resistance offered by the rubber to the action of the cutter. For the accommodation of the locking means, head A' is provided with a radial slot $n$ opening through the periphery of said head, see Figure 6, whereas head H' is provided with a similar slot $o$ and with openings (see dotted lines in Figure 7) for the reception of a cross pin O. In said slot $o$ of the head H' is positioned an end portion or jaw $p$ of a locking member P, said end portion or jaw $p$ fitting snugly in the slot $o$ and being provided with a longitudinal slot $p'$, through which passes the cross pin O, whereby the locking member P is attached to head H' so as to remain in place thereon and to be capable of a limited pivotal and slidable movement with respect to said head. The otherwise free end of the locking member is furnished with a lug $q$, in which is threaded an adjusting screw $q'$ the latter being loosely connected or swiveled to a jaw Q which is slidable upon the locking member P. This jaw is adapted to fit snugly within the slot $n$ of head A' so as to have contact with one wall of said slot $n$ in the driving member A', and thus said member A' imparts motion in a positive manner to the locking member P, the jaws $p$ Q of which are manipulated to mechanically grip the split rim R' adjacent the division line in said rim.

A cutting mechanism (including a knife K and controlling means therefor, such as lever L in Figure 3) is associated with the tire carrying and rotating heads A' H', as shown in Figure 6, said cutter being shiftable at will with reference to the path of the rotating rubber mass on the split rim, for the purposes of regulating the thickness of the rubber ribbon to be cut from said mass and for withdrawing the knife from the path of a hard substance embedded in said mass.

In the service of the apparatus shown in Figures 4 to 7, inclusive, head H' is shifted by its spindle I³ away from head A' to leave ample space for the introduction of the split rim and the tire between the heads A' H' and to allow the operator to place the rim into contact with the conical face of head A', after which said spindle I³ is operated for moving head H' toward head A' so that the conical face of head H' is in contact with the other edge of the split rim. Prior to fixedly clamping the split rim by and between the heads A' H', the locking device is manipulated for the jaw Q and screw $q'$ to enter the slot $n$ in head A', whereupon the locking device is positioned for the jaws $p$ Q to contact with the rim R' adjacent the division $r$ therein, and the screw $q'$ is manipulated for the jaws $p$ Q to grip the rim tightly, said rim being held also by and between the conical faces of the heads A' H'. Rotative movement is given to the tire, the rim and the heads A' H', and the cutter is moved and operated manually for slicing off a ribbon or length of the rubber from the rotating mass of rubber, the depth of the cut being determined by the manual manipulation of the lever and cutter, the operator holding said up to the rotating rubber mass to the limit permitted by the co-operating dog and ratchet member of the escapement means disclosed in Figure 3.

My procedure and apparatus make provision for the recovery of rubber from old or partially worn tires in a manner to produce rubber in a continuous length and of appropriate width so as to result in a ribbon substantially uniform in thickness. The procedure is of such a character that no deterioration in the quality of rubber takes place, and the product is in a condition making it available for use with or without treatment, for the reason that the rubber ribbon can be cut or stamped to produce a desired article, such as rubber heels or soles, etc. The recovery is performed expeditiously and with marked economy, and the procedure results in a substantial saving in material which otherwise becomes waste and scrap.

Having thus fully described the invention, what I claim as new and desire to secure by Letters Patent is:

1. An apparatus of the class described embodying a plurality of rotatable heads positioned in facing relation one to the other, said heads having means for wedging engagement with a tire rim interiorly thereof, whereby a tire rim is rotatably mounted for exposing the surface of a tire, means for imparting rotative movement to one of said heads and cutting means positioned in a plane substantially parallel to the axes of rotation of the rotatable heads, said cutting means acting to remove material from a tire for substantially the width thereof.

2. An apparatus of the class described embodying a plurality of rotatable heads positioned in facing relation and one of said heads being movable relatively to the other head, said heads being provided with means for wedging engagement with a tire rim interiorly thereof, means for rotating one of the heads, means for imparting a sliding movement to one head relatively to the other, cutting means positioned in a plane substantially parallel to the axes of rotation of said heads, said cutting means acting to remove material in a slice or ribbon for substantially the width of a tire operated upon.

3. An apparatus of the class described embodying a plurality of heads positioned in facing relation to each other, said heads having means within the perimeters thereof for wedging engagement with a tire rim and one of said heads being movable relatively to the other, means for imparting rotative movement to one of said heads, means for shifting one head relatively to the other, cutting means positioned in a plane substantially parallel to the axes of rotation of the heads, said cutting means being presented to the perimeter of a tire and acting to remove material from said tire for substantially the width thereof, and means operable at will for presenting and withdrawing said cutting means to and from the perimeter of a tire.

4. An apparatus of the class described embodying a plurality of heads positioned in facing relation and mutually co-operable for wedging engagement with a tire rim interiorly thereof, means for shifting one head relatively to the other, means for imparting rotative movement to one of said heads, cutting means positioned in a plane substantially parallel to the axes of rotation of the heads and in a plane substantially in the line of separation between the heads, said cutting means acting on the periphery of a tire and effecting the removal of material from said periphery for substantially the width of the tire, means operable at will for moving said cutting means, and means for arresting the travel of the cutting means toward the tire.

5. An apparatus of the class described embodying a plurality of heads co-operable for wedging engagement with the respective marginal portions of a tire rim, means for imparting rotative movement to one of said heads, means for fixedly retaining a split tire rim in operative position with respect to said heads, and cutting means mounted for adjustment toward and from said heads and controllable at will for movement relatively to the path of said tire.

6. An apparatus of the class described embodying a plurality of heads co-operable with each other and arranged for imparting rotative movement to a rubber mass, a locking member co-operating with said heads for retaining a split tire rim in fixed relation to said heads, and cutting means rising substantially vertically in the path of rotation of said rubber mass for severing a slice of ribbon in a continuous length therefrom.

7. An apparatus of the class described embodying a plurality of heads co-operable with each other and arranged for imparting rotative movement to a rubber mass, a locking member carried by one head and co-operating with the other head and with a split tire rim for retaining said rim in fixed relation to the heads, cutting means rising substantially vertically in the path of said rotative rubber mass, and means operable at will for shifting the cutting means toward or from the path of said rotative rubber mass.

8. An apparatus of the class described embodying a head with means for rotating the same, a head in facing and coaxial relation to the first named head, a tail stock spindle on which said second named head is idly mounted for free rotation, a swivel connection between the spindle and the second named head, wedging means on the second head for contact with a tire rim interiorly thereof, means for shifting one of said heads relatively to the other head whereby the wedging means acts to firmly retain a tire rim in fixed relation to said two named heads, and cutting means in a plane substantially parallel to the axes of rotation of said heads.

9. An apparatus of the class described embodying a plurality of coaxial heads positioned in facing relation, said heads having means for wedging engagement with a tire rim interiorly thereof, means for rotating one of said heads, and cutting means movable in a plane substantially at a right angle to the axes of rotation of the heads, said cutting means being presented tangentially to the periphery of a tire and acting to remove the material from said tire for substantially the width thereof.

In testimony whereof I have hereto signed my name this 21st day of April, 1922.

JAMES W. AMES.